United States Patent [19]
Alagy et al.

[11] 3,717,662
[45] Feb. 20, 1973

[54] PROCESS FOR MANUFACTURING EPOXYPROPANE AND ACETIC ACID

[75] Inventors: Jacob Alagy, La Celle St. Cloud; Christian Busson, Rueil Malmaison; Claude Gadelle, Rueil Malmaison; Irénée Sérée De Roch, Rueill Malmaison, all of France

[73] Assignee: Institut Francais du Petrole des Carburants et Lubrifiants, Rueil Malmaison, France

[22] Filed: June 26, 1970

[21] Appl. No.: 50,336

[30] Foreign Application Priority Data

July 10, 1969 France..................6923658

[52] U.S. Cl. ..................260/348.5 V, 260/533 R
[51] Int. Cl.........C07d 1/12, C07d 1/08, C07c 53/08
[58] Field of Search ....................260/348.5 V, 533 R

[56] References Cited

UNITED STATES PATENTS

| 2,890,245 | 6/1959 | Bonnet | 260/533 R |
|---|---|---|---|
| 3,282,994 | 11/1966 | Cox et al | 260/533 R |
| 3,071,601 | 1/1963 | Aries | 260/348.5 V |
| 3,247,249 | 4/1966 | Saffer et al | 260/348.5 V X |

FOREIGN PATENTS OR APPLICATIONS

37/9561   7/1962   Japan..................260/533 R

OTHER PUBLICATIONS

H. Mimoun et al., Bull. Soc. Chim., France No. 5, (1969), pp. 1481–1492.

*Primary Examiner*—Norma S. Milestone
*Attorney*—Millen, Raptes and White

[57] ABSTRACT

Combined process for manufacturing epoxypropane and acetic acid comprising a first stage of oxidizing, with molecular oxygen, up to 50 percent of a propylene charge dissolved in a paraffinic hydrocarbon in the presence of a molybdenum, tungsten or vanadium — containing catalyst, a second stage of fractionating the resulting product and separating from unconverted products epoxypropane and a heavy fraction, a third stage of oxidizing at least one part of said heavy fraction in the presence of a catalyst containing cobalt and/or manganese, and a fourth stage of separating the resulting acetic acid.

10 Claims, No Drawings

PROCESS FOR MANUFACTURING EPOXYPROPANE AND ACETIC ACID

The present invention relates to a combined process for manufacturing epoxypropane and acetic acid.

According to a process of the prior art, acetic acid can be obtained by oxidizing paraffinic hydrocarbons in the liquid phase; according to another process of the prior art, epoxypropane can be manufactured by oxidizing propylene in the liquid phase, the propylene being optionally diluted with propane. Various catalysts can be used.

Although such processes give substantial yields, they are however not entirely satisfactory since they lead to the formation of substantial amounts of oxygenated by-products which cannot be converted to valuable products.

The process of this invention, which obviates to the above-mentioned drawbacks, consists, in a first stage of treating by molecular oxygen the propylene dissolved in at least one paraffinic hydrocarbon containing from three to 10 carbon atoms, in the presence of a catalyst as hereabove defined and containing molybdenum, tungsten or vanadium; fractionating by distillation the resulting mixture when the conversion rate of propylene reaches a value between 3 and 50 percent, and preferably 5 to 25 percent, so as to obtain (a) a distillate containing at least the major part of the propylene and of the paraffinic hydrocarbons and (b) a distillation residue consisting essentially of products having a boiling point higher than that of propylene and of the paraffinic hydrocarbons, the distillate being recycled to the reaction zone of the first stage and the distillation residue having added thereto a compound of a metal selected from the group of cobalt and manganese and being treated, during a second stage with molecular oxygen, which results in the conversion of the products of a high boiling point to acetic acid.

The presence of paraffinic hydrocarbons which, under the operating conditions used, take part to the first oxidation reaction, provides for a good yield in epoxypropane.

It has been discovered that, in order to have an efficient epoxidation reaction, the compositions and operating conditions hereabove-mentioned must, preferably, be as follows :

The epoxidation (first stage) is carried out within a temperature range between 60° C and 250° C and preferably between 100° C and 200° C. The oxygen partial pressure is between 0.05 kg/cm² and 60 kg/cm² and, preferably, between 0.05 kg/cm² and 20 kg/cm². The oxidizing agent may consist of pure oxygen, air, or enriched air or air diluted with an inert gas. The presence of CO and $CO_2$ is not detrimental except that it leads to an increase of the total pressure in the reactor.

The solvent of the epoxidation reaction may be either a normal or branched saturated paraffinic hydrocarbon containing from three to 10 carbon atoms such as butane, isopentane or heptane, or a mixture of two or more of these compounds, this mixture being so constituted as to obtain the best efficiency, or preferably, a cut of hydrocarbons of the naphtha type having a distillation temperature between 30° C and 150° C, composed mainly of normal and branched paraffinic hydrocarbons.

It has been observed however that the hydrocarbons of at least four carbon atoms are clearly more favorable to the epoxidation reaction than propane, the effect of which on the yield of epoxypropane is not so clear.

The paraffinic solvent content of the mixture subjected to the first oxidation will be advantageously between 5 and 70 percent by weight but, in order to reduce the dilution effect which results in a decrease of the oxidation velocity, there will be preferably used solvent contents between 5 and 65 percent.

The catalysts of the epoxidation reaction according to the present invention, are constituted by molybdenum, tungsten or vanadium or one of their compounds.

The catalyst content will advantageously be between $10^{-1}$ and $10^{-6}$ cation-g of metal per kg of feed.

The catalyst may be used in the form of chelates. The chelate complexing agent may be an azo-compound of the general formula : $R - N = N - R'$ where R and R', which may be identical or different, are alkyl, cycloalkyl or aryl radicals optionally substituted, containing one to 30 carbon atoms, as described in the French patent application No. 166 396 of Sept. 16, 1968 or the published Dutch Pat. application No. 69/ 14.037.

The catalyst may be deposited on a solid carrier of the natural or synthetic zeolite type. The impregnation of the solid carrier is carried out according to conventional methods from a solution of a salt or of an acid of the considered metal. This type of catalyst is described in the French Pat. application No. 166.397 of Sept. 16, 1968 (published Dutch Pat. application No. 69/14.036).

The catalysts according to this invention may be salts of molybdenum, tungsten and/or vanadium acids with a nitrogenous base which can be an aliphatic or cyclic amine, preferably saturated, a quaternary ammonium base or a nitrogenous heterocyclic base.

As examples there will be mentioned :
pyridine tetramolybdate
piperidine paramolybdate
pyridine metavanadate
toluidine penta tungstate but these catalysts are not so good as the other catalysts mentioned in the present application.

The catalyst may be an organo metallic peroxydic derivative of molybdenum so tungsten having the raw formula :

wherein
M is molybdenum or tungsten,
A is a substituted or unsubstituted amide
$n$ is 1 or 2
the amides being of the organic amide type of the general formula :

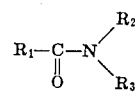

or of the type of an amide of mineral acid of the general formula :

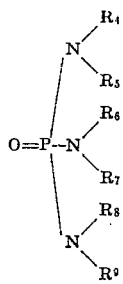

such as defined in the French Pat. application No. 136,933 of Jan. 19, 1968 (Dutch Pat. application No. 69/00015).

The olefin conversion may be from 3 to 50 percent and preferably from 5 to 25 percent in order to obtain the best selectivities in epoxypropane.

After separation of the epoxypropane, the residual propylene, the unconverted paraffin or paraffins, as well as the light epoxidation products such as aldehyde, ketone or alcohol, resulting from the degradation of propylene and of the paraffin or paraffins, are recycled. In contrast thereto the heavy mono-or polyfunctional oxidation products (average boiling point higher than about 130° C under normal pressure) such as esters, alcohols, aldehydes, ketones, acids and residues are treated in a second oxidation stage in order to convert the same to valuable products such as formic acid, acetic acid and other mono-and dicarboxylic acids having more than two carbon atoms.

This second oxidation stage, carried out in the liquid phase, may be conducted at a temperature within the range of 60°–250° C and preferably between 100° C and 250° C. The oxidizing gas may be pure molecular oxygen, air, enriched air or air diluted with nitrogen, the oxygen partial pressure being generally between 0.5 kg/cm² and 50 kg/cm² and preferably between 1 and 30 kg/cm².

The solvent of this oxidation stage is preferably acetic acid. The feed conversion rate is generally between 40 and 60 percent, the products which are not converted to valuable acids being recycled. At the inlet of the reactor, acetic acid corresponds to 30 to 70 percent of the feed.

The catalysts used during this second oxidation stage are Co or $M_n$ compounds for instance salts of carboxylic acids such as acetate, propionate, butyrate or naphthenate, which are soluble in the reaction medium. The catalyst concentrations may be between 10 and 1000 ppm and preferably between 10 and 200 ppm.

The following nonlimitative examples illustrate the present invention. Example 1 is given for comparative purpose. The experiments have been carried out in a reactor of stainless steel provided with stirring by means of a turbine.

EXAMPLE 1

510 g of propylene in 800 g of benzene are subjected to oxidation at 150° C under an oxygen partial pressure of 15 kg/cm². The catalyst is a molybdenum compound of the formula $H_2MoO_6,A$ wherein A is hexamethylphosphotriamide. The catalyst concentration is $3 . 10^{-4}$ gram-atom of Mo per Kg of feed.

For a conversion of 8 percent, the selectivity to epoxypropane is 42 percent.

EXAMPLE 2

510 g of propylene in 800 g of normal heptane are subjected to oxidation at 150° C under an oxygen partial pressure of 15 kg/cm². The same catalyst at the same concentration as in Example 1 is used. For a 8 percent conversion of the olefin, the selectivity to epoxypropane is 53 percent. Under these conditions, 6 percent of normal heptane are converted. 45 percent of the resulting products consists of heavy products and residues. The heavy products and residues are then oxidized in acetic acid in the presence of 30 ppm of cobalt in the form of cobalt naphthenate at a temperature of 180° C and under an oxygen partial pressure of 15 kg/cm². Per Kg of heavy product and residue there are obtained 600 g of acetic acid.

EXAMPLE 3

400 g of propylene in 700 g of light naphtha having a distillation temperature between 35° C and 99° C are subjected to oxidation at 155° C under an oxygen partial pressure of 10 kg/cm². The catalyst is hexamethylphosphotriamide diperoxomolybdate at a concentration of $1.10^{-4}$ gram-atom of molybdenum per Kg of feed. For a propylene conversion of 18 percent, there is obtained a selectivity to epoxypropane of 57 percent. The light naphtha conversion in these conditions is 10 percent. The heavy products and residues from propylene and naphtha are subjected to oxidation at 190° C in acetic acid in the presence of cobalt acetate as catalyst at a concentration of 10 ppm, the oxidizing gas being air under a pressure of 20 kg/cm². There are obtained, per kg of heavy products and residue subjected to this oxidation, 0.7 kg of acetic acid.

EXAMPLE 4

Under the same conditions as in example 2, 400 g of propylene are subjected to oxidation in 850 g of butane. For a 13 percent conversion of propylene, the selectivity to epoxypropane is 55 percent. The conversion of butane is 10 percent. The heavy products and residues which represent 40 percent of resulting products, are subjected to a second oxidation stage conducted under the same conditions as in Example 2.

Per kg of feed, there are obtained 750 g of acetic acid.

EXAMPLE 5

500 g of propylene in 800 g of light naphtha of a distillation temperature between 40° C and 110° C, are subjected to oxidation at 150° C under a partial pressure of 10 kg/cm² of oxygen. The catalyst used is powdered finely divided molybdenum (grains diameter lower than 0.04 mm or 400 mesh), at the concentration of $10^{-3}$ gram atoms of Mo per kg of feed. For a propylene conversion of 9 percent, there is obtained a 56 percent selectivity to epoxypropane. The conversion rate of naphtha under these conditions is 6, 35 percent of the resulting products being heavy products and residues. The oxidation of the heavy products and residues under the same conditions as in example 3 gives 0.75 kg of acetic acid per kg of feed.

EXAMPLE 6

400 g of propylene are subjected to oxidation at 150° C under an oxygen partial pressure of 12 kg/cm² with the use as solvent of 750 g of a mixture consisting of 90 percent by volume of light naphtha of a distillation temperature between 35° C and 105° C and of 10 percent by volume of light oxidized products having an average boiling point lower than about 120° C under normal pressure, produced in a preceding oxidation stage conducted as described in Example 3, which products are mainly consisting of acetaldehyde, acetone, propionaldehyde and butanone. The hexamethylphosphotriamide diperoxomolybdate at a concentration of $1 \times 10^{-4}$ gram-atoms of Mo per kg of feed is used as catalyst. For a propylene conversion of 15 percent, there is obtained a selectivity of 59 percent to epoxypropane.

The heavy products from the first oxidation stage are contacted in acetic acid with air under a pressure of 17 kg/cm² at 185° C, the catalyst being cobalt acetate.

There is obtained 0.72 kg of acetic acid per kg of heavy products and residue.

EXAMPLE 7

Example 2 is repeated with different catalysts of the first stage as hereunder stated :
N,N-dimethylformamide diperoxomolybdate
N,N-dimethylformamide diperoxovanadate
N,N-dimethylacetamide diperoxomolybdate
N,N-diphenylformamide diperoxomolybdate
N-methyl N-isobutyl benzamide diperoxomolybdate
N-ethyl N-phenyl acetamide diperoxotungstate The catalyst concentration is $3 \cdot 10^{-4}$ gram atom of molybdenum, tungsten or vanadium per kg of feed.

In all cases the results obtained are substantially equivalent to those of Example 2

EXAMPLE 8

Example 3 is repeated except that hexamethylphosphotriamide diperoxomolybdate is replaced by a molecular sieve 13 X having a molybdenum content of 8.5 percent by weight; the amount of catalyst used in the reaction corresponding to $3 \cdot 10^{-4}$ gram-cations per Kg of feed.

Substantially the same results are achieved.

EXAMPLE 9

Example 4 is repeated, except that the catalyst of the first stage is replaced by the two catalysts A and B as follows [4-(N-methyl-N'-β-cyanoethyl-sulfonamide) - 1-hydroxy-2-phenyl]-azo-αaceto-acetanilide)M
M = Mo (catalyst A) or W (catalyst B)

The metal content is $3 \cdot 10^{-4}$ gram-cation per kg of feed.

Substantially the same results are obtained.

We claim :

1. A combined process for manufacturing epoxypropane and acetic acid from propylene, consisting, in a first stage, of treating, within a temperature range between 60° C and 250° C, by a gas containing molecular oxygen, propylene dissolved in at least one paraffinic hydrocarbon containing from three to 10 carbon atoms per molecule, in the presence of a catalyst containing at least one of the elements selected from the group consisting of molybdenum, tungsten and vanadium, converting 3 to 50 percent of propylene, fractionating, in a second stage, the resulting products so as to separate, in addition to epoxypropane and unconverted compounds, a heavy fraction containing oxidation products having an average boiling point higher than 130° C under normal atmospheric pressure, contacting in a third stage separate and distinct from said first stage, at a temperature within the range of 60°-250 ° C, at least one part of said heavy fraction, with a gas containing molecular oxygen, in the presence of a catalyst consisting essentially of at least one of the compounds selected from the group consisting of cobalt and manganese salts of carboxylic acids, the catalyst concentration being between 10 and 1,000 p.p.m. and separating in a fourth stage, the resulting acetic acid.

2. Process according to claim 1, wherein the paraffinic hydrocarbon during the first stage is selected from light naphthas, butane, isopentane and heptane.

3. Process according to claim 1, wherein the catalyst used during the first stage is a salt formed between a nitrogenous base and a molybdenum, tungsten or vanadium acid.

4. Process according to claim 1, wherein the catalyst used during the first stage has the general formula :

M is molybdenum or tungsten
n is an integer equal to 1 or 2
A is an organic amide of the formula :

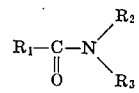

or an amide of an organic acid of the formula:

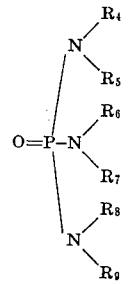

wherein radicals $R_1$ to $R_8$ are hydrogen or hydrocarbon monovalent radicals having from one to 20 carbon atoms, $R_2 - R_3$, $R_4 - R_5$, $R_6 - R_7$, and $R_8 - R_9$ being optionally part of the same bivalent radical.

5. Process according to claim 1 wherein the catalyst of the first stage is used in the form of a chelate.

6. Process according to claim 1 wherein the heavy fraction is dissolved in acetic acid during the third stage.

7. Process according to claim 1 wherein the operating conditions are as follows :
   a. during the first stage : temperature between 100 and 200° C, oxygen partial pressure between 0.05 and 20 kg/cm², catalyst content between $10^{-6}$ and $10^{-1}$ g-cation of metal per kg of feed.
   b. during the third stage : temperature between 100 and 250° C, oxygen partial pressure between 1 and 30 kg/cm².

8. Process according to claim 1, wherein the catalyst of the first stage is supported on a zeolite.

9. A process according to claim 1 wherein the catalyst concentration during the third stage is less than 200 p.p.m.

10. A process according to claim 1 wherein the temperature of the third stage is about 30°– 40° C higher than the temperature of the first stage, the temperature of the latter stage being about 150°– 155° C.

* * * * *